United States Patent Office 3,706,718
Patented Dec. 19, 1972

3,706,718
CATALYST AND METHOD FOR MAKING EPDM
HAVING IMPROVED PROCESSABILITY
Frederick C. Loveless, Oakland, and Don H. Miller,
Wayne, N.J., assignors to Uniroyal, Inc., New York,
N.Y.
No Drawing. Filed May 10, 1971, Ser. No. 142,058
Int. Cl. B01j 11/00; C08f 15/40
U.S. Cl. 260—80.78                                    12 Claims

ABSTRACT OF THE DISCLOSURE

The use of polypropylene glycol in the manufacture of EPDM based on a cyclic diene (e.g., dicyclopentadiene or ethylidene norbornene) with catalyst containing (a) vanadium oxytrichloride and (b) alkylaluminum sesquihalide or dialkylaluminum halide, leads to decreased long chain branching and consequent improved processability.

---

This invention relates to a catalyst system and method for making EPDM terpolymer rubber.

Manufacture of EPDM using soluble catalyst comprising a vanadium compound and an alkylaluminum halide is known, but unfortunately when the diene is a polycyclic diene there is an undesirable tendency for long chain branches to form during the polymerization, with the result that the elastomer is difficult to process. Certain Lewis bases have been used in preparation of EPDM. U.S. Pat. 3,562,228, Matthews et al., Feb. 9, 1971, teaches the use of certain Lewis bases, but not for the purpose of improving the linearity and processability of the polymer; polypropylene glycol is not disclosed.

In accordance with the invention it has now been found that the use of polypropylene glycol in EPDM terpolymerization results in a remarkable and unexpected reduction in long chain branching, with consequent great improvement in the processability.

In practicing the invention, ethylene, propylene and a non-conjugated polycyclic diene are terpolymerized in solution in a non-oxidizing inert medium consisting of a hydrocarbon solvent, by the action of a soluble anionic coordination catalyst comprising (a) vanadium oxytrichloride and (b) alkylaluminum sesquihalide or dialkylaluminum halide, in the presence of polypropylene glycol. Surprisingly, the presence of polypropylene glycol leads to geratly reduced long chain branching and remarkably improved processing.

Improved processing is a very much desired characteristic in an EPDM rubber, particularly EPDM's based on polycyclic dienes, which have suffered from poor processing characteristics brought about by the tendency of such dienes to produce long chain branches during the polymerization. The poor processing of conventional cyclic diene type of EPDM is manifested in excessively long milling times required to form a continuous band on a rubber mill, poor extrusion characteristics, and the like. The invention teaches a way to produce a highly linear EPDM with such cyclic dienes, by the use of polypropylene glycol.

The cyclic dienes employed in the invention are non-conjugated bridged-ring or fused ring cyclic dienes, such as bicyclononadiene, dicyclopentadiene, a 5-alkylidene-2-norbornene (e.g., 5-methylene-2-norbornene, 5-ethyli- dene-2-norbornene, 5-propylidene-2-norbornene), etc. The relative proportions of ethylene, propylene and cyclic diene used in the process may be as in conventional practice for producing amorphous sulfur vulcanizable unsaturated EPDM terpolymer rubbers.

It is to be emphasized that the catalyst system employed is of the soluble kind (i.e., soluble in the monomers and/or in the inert hydrocarbon used as the polymerization medium, e.g., hexane, cyclohexane, benzene, etc.) as distinguished from insoluble or heterogeneous catalysts. The solubility of the catalyst is a consequence of the particular ingredients employed, and their proportions.

The catalyst system of the invention is based on:

(a) Vanadium oxytrichloride;
(b) Alkylaluminum sesquihalide or dialkylaluminum halide; and
(c) Polypropylene glycol.

In the organoaluminum compound (b) the alkyl group may be methyl, ethyl, propyl, butyl, etc., and the halogen is usually chlorine, although bromine or other halogen may be used. The polypropylene glycol employed has a molecular weight of from 200 or less to 3000 or more, frequently from about 300 to about 2000. The substantial non-volatility of such polypropylene glycol is an advantage in that the material is not recycled with recovered monomers or solvent.

The molar ratio of aluminum to vanadium in the catalyst is ordinarily at least about 4:1 and frequently not greater than 50:1, although there is no upper limit (e.g., ratios of 500:1 or more may be used). The polypropylene glycol is employed in amount sufficient to provide at least one mole of ether oxygen per mole of vanadium, up to one mole of ether oxygen per mole of aluminum as a maximum. Preferably the amount of polypropylene glycol is such as to provide not more than one-half mole of ether oxygen per mole of aluminum.

The polymerization temperature employed ranges from about 10° C. up to about 120° C.

The process is carried out in a solvent which is not an oxidizing agent and which is inert under the conditions of the reaction. The solvent medium consists essentially of a hydrocarbon solvent, which takes no part in the catalyst-forming reaction or the polymerization reaction whether it is an aliphatic solvent, as n-hexane, or a cycloaliphatic solvent, as cyclohexane, or an aromtic solvent, as benzene.

The procedure may otherwise be the same as in conventional practice as far as such details as type of polymerization equipment, pressure, concentration of catalyst, and the like, are concerned and may be carried out batchwise or continuously (see for example U.S. Pat. 3,341,-503, Paige et al., Sept. 12, 1967). Incremental addition of ingredients may be employed. In a continuous polymerization the organo-aluminum compound, the polypropylene glycol and the vanadium compound may be added as separate feeds to the monomer solution. In a batch polymerization a preferred procedure involves combining the organo-aluminum compound and the polypropylene glycol in the presence of at least a portion of the monomers and then adding the vanadium compound.

The improvement in processability (linearity) brought about by the presence of polypropylene glycol from the start of the terpolymerization in accordance with the invention is manifested in significantly reduced milling time required to form a continuous band of the terpolymer rubber on a mill, with consequent economy, efficiency and ease of compounding and shaping. The increased linearity (decreased long chain branching) of the product of the present process may be expressed as a number termed the "branching index," which may in turn be calculated from measured values of the zero shear viscosity (see Tokita et al., Rubber Chemistry and Technology, vol. 42, No. 2, June 1969, p. 944) and the intrinsic viscosity. The branching index, "B.I.," is given by the expression B.I.=$\log_{10}$ ($n_0$)—4.39 $\log_{10}$ (I.V.)—5.06 where $n_0$ is the zero shear viscosity (expressed as poises, measured at 130° C.) and I.V. is the intrinsic viscosity (expressed as deciliters per gram measured in tetralin at 135° C.). As will be seen from the working examples below, polypropylene glycol results in remarkable reduction in the branching index of terpolymer rubber made by the process described. This is particularly surprising in view of the fact that substitution of many other Lewis bases for polypropylene glycol fails to effect a satisfactory reduction in branching index. It is also important to note that mere addition of polypropylene glycol at the conclusion of the polymerization or in the course of the recovery of the terpolymer, as a short stop or as a stabilizer, fails to accomplish the presently desired result of producing highly linear terpolymer. This is an important distinction over practices such as described in U.S. Pats. 3,547,855, Loveless, Dec. 15, 1970, 3,496,135, Caywood, Feb. 17, 1970 and British Pat. 1,225,853, Uniroyal, Inc., Mar. 24, 1971 wherein certain Lewis bases are added at the conclusion of the polymerization or during the recovery of the polymer, rather than at the start of the polymerization.

It will be understood that the invention has no applicability to the preparation of saturated binary ethylene-propylene copolymers, since the problem of long chain branching occurs only when a third monomer—the cyclic diene—is present. In this respect, and in other respects, the invention is distinct from U.S. Pat. 3,369,011, Valvassori et al., Feb. 13, 1968.

The following examples will serve to illustrate the practice of the invention in more detail.

EXAMPLE I

The reactor employed is a dry one-gallon glass autoclave equipped with a pressure gauge, thermometer, gas inlet tube, stirrer, and a rubber gasket for liquid injection. Into this is introduced 3000 ml. of dry n-hexane at room temperature (about 25° C.), 30 mmoles of ethylaluminum sesquichloride (abbreviated as "EASC" in Table I), as a 25% by weight solution in hexane, and 5 ml. of 5-ethylidene-2-norbornene (abbreviated as "ENB" in Table I). Propylene gas is fed to a pressure of 20 p.s.i.g. initially. The pressure is brought to 50 p.s.i.g. by feeding additional ethylene and propylene in a 2/1 molar ratio. Then 1.75 grams of polypropylene glycol having a molecular weight of 425 is added; this amount represents 30 mmoles of ether oxygen. Next is added 3.0 mmoles of vanadium oxytrichloride as a 10% by volume solution in hexane. The molar ratio of ether oxygen to vanadium is therefor 10/1. Polymerization sets in as evidenced by a rise in temperature of about 15° C. The reaction is allowed to proceed adiabatically for (temperature about 30–35° C.) 30 minutes while maintaining the 50 p.s.i.g. pressure by continued feeding of ethylene and propylene at 2/1 molar ratio. The resulting terpolymer is precipitated by adding the reaction mixture to 3000 ml. of isopropanol containing 0.4% by weight of 2,2'-methylenebis(4-methyl-6-t-butylphenol) antioxidant. The polymer is dried overnight. The yield is 91.2 grams of polymer containing 36% propylene by weight; iodine number, 14.5; intrinsic viscosity, 3.10 deciliters per gram in tetralin at 135° C.; zero shear viscosity 2.8×$10^7$ poises at 135° C. From the values of zero shear viscosity and intrinsic viscosity the branching index is calculated at 0.67, using the equation given above.

Repetition of the example without the polypropylene glycol addition gives 61.8 grams of terpolymer containing 42% propylene by weight; iodine number, 13; I.V., 1.60; zero shear viscosity, 1.14×$10^8$ poises. The branching index is 2.02. In this and subsequent examples, results with and without addition of polypropylene glycol are summarized in sub-columns A and B, respectively, of Table I, wherein sub-columns A represent the practice of the invention and sub-columns B represent controls.

TABLE I.—TERPOLYMERIZATION WITH AND WITHOUT POLYPROPYLENE GLYCOL ADDITIVE

| Example | I | | II | | III | | IV | |
|---|---|---|---|---|---|---|---|---|
| Mmoles organoaluminum compound: | | | | | | | | |
| EASC | 30 | | 15 | | | | | |
| DEAC | | | | | 30 | | | |
| DIBAC | | | | | | | 30 | |
| Amount of diene, ml.: | | | | | | | | |
| ENB | 5 | | | | 4.2 | | 5 | |
| DCPD | | | 5 | | | | | |
| Pressure after initial olefin feed, p.s.i.g | 20 | | 25 | | 31 | | 35 | |
| Pressure after additional olefin feed, p.s.i.g | 50 | | 50 | | 50 | | 50 | |
| Molar ratio E/P in additional feed | 2/1 | | 1/0 | | 1/0 | | 1/0 | |
| Mmoles VOCl$_3$ | 3.0 | | 0.8 | | 2.0 | | 2.0 | |
| Molar ratio ether oxygen in PPG to vanadium | 10/1 | | 5 1 | | 5/1 | | 5/1 | |
| Molar ratio E/P in continuous feed | 2/1 | | 1/1 | | 1/2 | | 1/1 | |
| Terpolymer properties | A | B | A | B | A | B | A | B |
| Yield, grams | 91.2 | 61.8 | 28.0 | 39.0 | 60.3 | 69.5 | 23.8 | 39.4 |
| Weight percent propylene | 36 | 42 | 38 | 42 | 40 | 57 | 37 | 59 |
| I.V | 3.1 | 1.6 | 2.31 | 2.3 | 3.07 | 3.34 | 3.78 | 3.18 |
| I$_2$ No | 14.5 | 13 | 8.2 | 6.2 | 16 | 9.4 | 13 | 12.5 |
| Branching index | 0.67 | 2.02 | 1.97 | 2.34 | 0.83 | 1.11 | .28 | .99 |

EXAMPLE II

The procedure of Example I is followed, except that the dienic termonomer employed is dicyclopentadiene in place of 5-ethylidene-2-norbornene, and other parameters are as indicated in Table I, wherein "DCPD" stands for dicyclopentadiene. The dicyclopentadiene is added in two portions, 3 ml. at the start and 2 ml. after 10 minutes of reaction. The yield is 28.0 grams of terpolymer; propylene content, 38%, I.V., 2.31, iodine number 8.2; branching index 1.97. In an otherwise similar run from which the polypropylene glycol is omitted, the yield is 39.0 grams; propylene content, 42%; I.V., 2.30; iodine number, 6.2; branching index, 2.34.

EXAMPLE III

This example is carried out according to the procedure described in Example I. The cyclic diene is 5-ethylidene-2-norbornene (3 ml. added at start, 1.2 ml. added after 10 minutes reaction), the organoaluminum compound is diethylaluminum chloride (abbreviated as "DEAC" in Table I) and other parameters are as indicated in Table I. The yield of terpolymer rubber is 60.3 grams; propylene content, 40%; iodine number, 16; I.V., 3.07; branching index 0.83.

In an otherwise similar run from which the polypropylene glycol is omitted, the yield is 69.5 grams; propylene content, 57%; iodine number, 9.4; I.V., 3.34; and branching index 1.11.

Thus, the branching index with polypropylene glycol is significantly lower, despite the considerably higher iodine number.

EXAMPLE IV

This example, summarized in Table I, employs 5-ethylidene-2-norbornene (3 ml. added at start, 2 ml. after 10 minutes) and diisobutylaluminum chloride ("DIBAC" in Table I).

With polypropylene glycol the yield is 23.8 grams; propylene content 37%; iodine number 13; I.V., 3.78; and branching index, .28.

Without the polypropylene glycol addition at the start of the polymerization in accordance with the invention the yield is 39.4 grams; propylene content, 59%; iodine number, 12.5; I.V., 3.18; and branching index, .99.

The processing characteristics of a polymer may be judged by its behavior on a conventional rubber mill. A polymer is judged to have good processing characteristics if it forms a clear, smooth, adhering band on the front roll of the mill. As is well known to those skilled in the art most rubbers will form an adhering band if the nip distance (clearance between the rolls) is made small enough. As the nip is increased the rubber will tend to lose the smooth, adhering band. Therefore, the maximum nip at which a rubber forms a smooth, adhering band is a measure of its processing characteristics. The larger the nip, the better the processing characteristics are judged to be.

A procedure for determining the maximum nip of a rubbery polymer is as follows. A conventional 3" x 8" rubber mill having a friction ratio of 1.4 and a nip of 0.040 inch is set with mill roll surface temperature of 80° C. A 75-gram sample of raw, uncompounded polymer is compacted and passed repeatedly (ca. two minutes) through the nip of the mill until a sheet is formed. The sheet is then folded once on itself and rolled into an elongated cylinder. Keeping the nip at 0.040 inch the cylinder is then inserted on end into the nip and guided onto the front roll. If the polymer does not form an adhering band but bags or hangs from the front roll, the nip is decreased by 0.001 inch, the sheeted polymer is rolled up and inserted into the mill and guided around the front roll. This procedure is repeated, decreasing the nip each time by 0.001 of an inch until the rubber starts to form a smooth, adhering band on the front roll. The nip distance at which this occurs is called the maximum nip distance.

Table II shows the maximum nip distance, determined by the procedure just described, for two different EPDM terpolymers, one made without polypropylene glycol, and the other made with polypropylene glycol (2000 molecular weight) in accordance with the invention. In both cases, the cotninuous procedure of U.S. Pat. 3,341,503, Paige et al., Sept. 12, 1967 was used. The catalyst was vanadium oxytrichloride, the cocatalyst was diisobutylaluminum chloride, and the termonomer was 5-ethylidene-2-norbornene. It will be seen from Table II that the polypropylene glycol resulted in a significant increase in the maximum nip distance (better processing) as well as decreased branching index.

TABLE II

| EPDM | E/P weight ratio | ML-4, 212° F. | Maximum nip distance, inches | Branching index |
|---|---|---|---|---|
| Made without polypropylene glycol | 52/48 | 40 | 0.027 | 0.72 |
| Made with polypropylene glycol | 51/49 | 40 | 0.035 | 0.41 |

Table III shows a similar comparison, where the cocatalyst is a mixture of equal parts of diisibutylaluminum chloride and ethylaluminum sesquichloride.

TABLE III

| EPDM | E/P weight ratio | ML-4, 212° F. | Maximum nip distance, inches |
|---|---|---|---|
| Made without polypropylene glycol | 51/49 | 36 | 0.015 |
| Made with polypropylene glycol | 53/47 | 45 | 0.035 |

Having thus described our invention what we claim and desire to patent by Letters Patent is:

1. A catalyst system for the manufacture of substantially linear unsaturated ethylene-propylene-non-conjugated polycyclic diene terpolymer rubber characterized by good processability comprising in combination:
   (a) vanadium oxytrichloride;
   (b) an organoaluminum halide selected from the group consisting of alkylaluminum sesquihalide and dialkylaluminum halide; and
   (c) polypropylene glycol, the molecular weight of (c) being from 200 to 3000, the molar ratio of aluminum to vanadium being from 4:1 to 20:1, and the amount of (c) being sufficient to provide at least one mole of ether oxygen per mole of vanadium, up to one mole of ether oxygen per mole of aluminum.

2. A catalyst as in claim 1 in which (b) is ethylaluminum sesquichloride.

3. A catalyst as in claim 1 in which (b) is diisobutylaluminum chloride.

4. A catalyst as in claim 1 in which (b) is diethylaluminum chloride.

5. A catalyst as in claim 1 in which the molecular weight of (c) is from 300 to 2000, and the amount of (c) is sufficient to provide at least one mole of ether oxygen per mole of vanadium, up to one-half mole of ether oxygen per mole of aluminum.

6. A method of manufacturing substantially linear unsaturated ethylene-propylene-non-conjugated polycyclic diene terpolymer rubber characterized by good processability comprising contacting the said monomers with the catalyst of claim 1 in an inert hydrocarbon solvent.

7. A method as in claim 6 in which (b) is ethylaluminum sesquichloride.

8. A method as in claim 6 in which (b) is diisobutylaluminum chloride.

9. A method as in claim 6 in which (b) is diethylaluminum chloride.

10. A method as in claim 6 in which the molecular weight of (c) is from 300 to 2000, and the amount of (c) is sufficient to provide at least one mole of ether oxygen per mole of vanadium, up to one-half mole of ether oxygen per mole of aluminum.

11. A method as in claim 6 in which the diene is dicyclopentadiene.

12. A method as in claim 6 in which the diene is 5-ethylidene-2-norbornene.

References Cited

UNITED STATES PATENTS 2,965,626  12/1960  Pilar _____ 260—94.9
3,168,588  2/1965  White _____ 260—683.15

JAMES A. SEIDLECK, Primary Examiner

R. S. BENJAMIN, Assistant Examiner

U.S. Cl. X.R.

252—429 B